March 18, 1947. F. L. STOCKWELL 2,417,790
TRAILER
Filed May 6, 1944
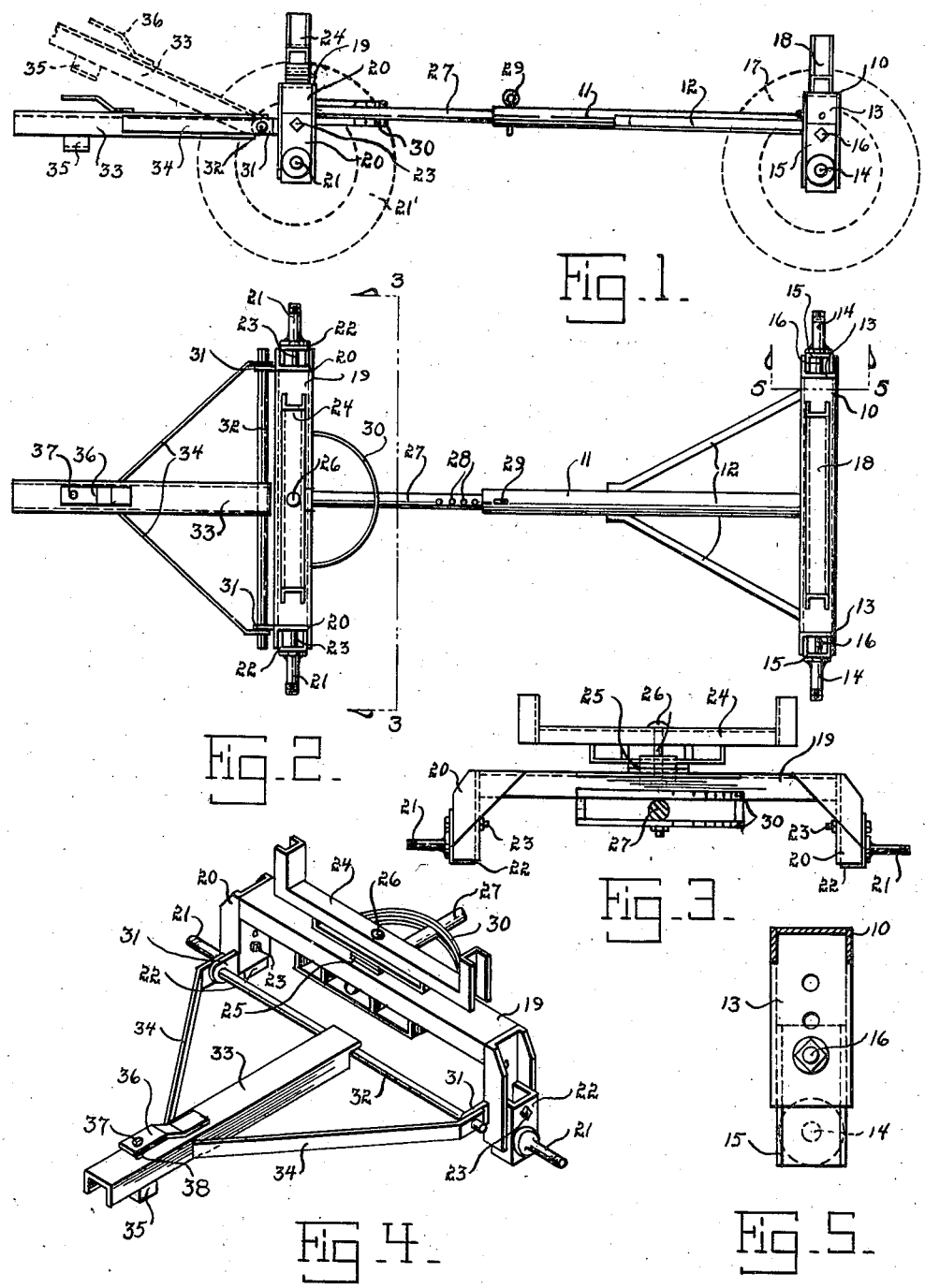
INVENTOR.
F. L. STOCKWELL
BY Corey and Fletcher Patented Mar. 18, 1947

2,417,790

UNITED STATES PATENT OFFICE 2,417,790

TRAILER

Fred L. Stockwell, Garner, Iowa

Application May 6, 1944, Serial No. 534,427

10 Claims. (Cl. 280—116)

The principal object of this invention is to provide a trailer assembly having all of the inherent features necessary in a farm trailer wagon, such as an extendable reach, a full pivot axle with center steering, and a pivoted and versatile draw-bar.

A further object of my invention is to provide a trailer assembly having a high clearance that is adjustable to meet varying needs and requirements.

A still further object of this invention is to provide a trailer that is extremely economical in manufacture, durable, and efficient in use.

These and other objects will be apparent to those skilled in the art.

My invention consists in the construction, arrangement and combination of the various parts of the device, whereby the objects contemplated are attained as hereinafter more fully set forth, pointed out in my claims, and illustrated in the accompanying drawings, in which:

Figure 1 is a side elevational view of the trailer assembly with the wheels removed and ready for use.

Figure 2 is a top plan view of the trailer assembly with the wheels removed.

Figure 3 is a rear cross sectional view of the front axle assembly, and is taken on the line 3—3 of Figure 2.

Figure 4 is a front perspective view of the axle assembly of my trailer, and

Figure 5 is a side cross sectional view of one of the axle hangers more fully illustrating its structure.

Heretofore, trailers to be adapted to wagon boxes of various sizes have had several very undesirable features. The draw-bar was not universal in its use; the steering knuckles of automobiles were used, thereby causing the trailer to have a considerable amount of side sway or weave. The front bolster was not flexible, and the trailers had such a low clearance as to make them impractical for use in the field. Furthermore, such trailers could not be adapted to all types of work, inasmuch as a trailer of low clearance could not be used in the field, and a trailer having a high clearance was unstable on the road. Furthermore, there are times when it is desirable to hook a trailer to a tractor and other times when it is desirable to hook them to a team.

Therefore, a trailer of this type must be extremely flexible in its utility. Such a trailer I have provided and will hereinafter describe.

Referring now to the drawings:

I have used the numeral 10 to indicate the rear cross beam or axle having the reach tube 11 extending from its central portion and securely braced thereto through the medium of the brace rods 12. The vertical portions of this rear axle assembly are designated by the numerals 13 and extend downwardly as shown in Figure 1.

I have used the numerals 14 to indicate an axle secured to a block member 15 capable of being secured within the vertical member 13 by means of bolts or like 16 at several points therein. The numeral 17 indicates an ordinary automobile wheel having a pneumatic tire thereon and rotatably mounted on the axle 14 in the usual manner.

The numeral 18 indicates the rear bolster secured to the top of the beam 10. The forward portion of the trailer comprises a forward beam 19 having the vertical clearance beams or elements 20 rigidly secured thereto.

The numerals 21 indicate axle shafts rigidly secured to a block 22, which in turn is capable of being slidably and adjustably mounted within the vertical member 20 through the medium of the bolts or like 23.

The numeral 24 indicates a floating wagon bolster which is mounted upon bearing plates 25 and is free to rotate on a bolt or spindle member 26 as shown in the drawings. The bolt 26 extends downwardly through the bolster 24, the plates 25, thence through the front axle beam 19, and through the forward end of a reach bar 27. The rearward end of the reach bar 27 slidably engages the tube 11 and has a plurality of holes 28 cut therethrough for receiving a pin 29, which in turn extends through the tube 11 and the selected hole 28, and thence out through the other side of the tube 11 for permitting the adjustment of the distance between the bolsters 18 and 24 for the accommodation of various lengths of wagon boxes or the like.

The numeral 30 indicates a quadrant rigidly secured to the axle beam 19 on either side of the shaft or reach member 27 and in the usual manner. I have used the numerals 31 to indicate ears extending forwardly from the vertical portions 20 of the front axle beams 19. The numeral 32 indicates a shaft rotatably mounted in the ears 31 and having a tongue portion or draw-bar 33 secured to its central portion and extending forwardly. The numerals 34 indicate brace rods having one end secured to the tongue member 33 and the other end rotatably embracing the shaft 32.

The beam or draw-bar 33 is constructed of channel iron and has a strap or loop 35 secured thereto for permitting the insertion of a tongue into the draw-bar 33.

The numeral 36 indicates a strap member rigidly secured to the upper side of the draw-bar 33 extending upwardly and thence forwardly and having a hole 37 therein registering with a hole 38 in the draw-bar 33 for permitting the insertion of a pin therethrough for either connecting the strap 36 to a tractor draw-bar, or for holding a tongue in place within the channel portion of the tongue or draw-bar 33. By this structure, the complete draw-bar may be swung upwardly and out of the way in the direction indicated by the dotted lines in Figure 1, and is adaptable for use with a tongue or possesses an inherent clevis to be connected to the draw-bar of a tractor.

The center pivot 26 prevents the trailer from weaving when towed at high speed, and eliminates many wearing parts over the conventional steering knuckle type of steering control. The front bolster 24 is free floating and readily aligns itself in conformity to the wagon box placed upon the trailer. The reach member comprising the rod 27 and the sleeve 11 permits the adjustment of the trailer to any length. The important feature of a trailer of this type is its ability to permit clearance over crops of various types, to prevent bruising the plant, while at the same time providing a stable trailer assembly.

I have provided such a structure by the use of the blocks 15 and 22 sliding within the vertical channel members 20, and the correct height or clearance can be predetermined to provide the proper type of clearance for a specific job. The axle hangers 15 and 22 may then be rigidly secured to the vertical members 20 and may even be welded in place after the proper clearance has been established. If it is desirable to make them quickly adjustable, the bolts 16 and 23 may be used for securing the blocks 15 and 22 to the upright portions 13 and 20.

By this structure, the trailer assembly may be prefabricated, and any length or clearance height may be given to a trailer purchased for a specific job.

The trailer has a versatile draw-bar capable of being swung upwardly and out of the way, and having a tongue securing means as well as a clevis thereon. The front axle beam 19 pivots from the center, making the trailer easy to pull and preventing weave or side sway when the trailer is towed at high speeds. The front bolster is free floating, and the device can be adjusted for any clearance desired by the user.

Thus it will be seen that I have provided a trailer structure that fulfills all of my objects and presents many more obvious advantages.

Some changes may be made in the construction and arrangement of my improved trailer without departing from the real spirit and purpose of my invention, and it is my intention to cover by my claims any modified forms of structure or use of mechanical equivalents which may be reasonably included within their scope.

I claim as my invention:

1. In a trailer structure, a beam element, axle hanger members extending downwardly from each end of said beam element, a means for securing axle members to said axle hanger members, a draw-bar pivotally secured to the lower portions of said axle hanger members, a clevis on said draw-bar, a channel in said draw-bar, and a strap member over the channel portion of said draw-bar for permitting said draw-bar to receive a tongue or like.

2. In a trailer, a gear including an axle comprising a transverse member, a generally downwardly extending channel beam fixed at its upper end in depending relation to each end of said transverse member with the flanges of each of said downwardly extending beams extending laterally outwardly, a vertically shiftable spindle-carrying member disposed between the flanges of each of said downwardly extending channel beam in substantially close fitting contacting relation and thus arranged to be guided and stabilized thereby against fore and aft displacement and against rotation about a generally vertical axis, and means for securing each of said spindle-carrying member in any one of a number of positions of adjustment.

3. In a trailer, a gear including an axle comprising a transverse channel having its web portion uppermost and depending flanges, an axle hanger fixed at its upper end to the ends of said transverse channel, each axle hanger comprising a short section of channel having its flanges extending laterally outwardly and its web welded or otherwise secured to the ends of the transverse flanges and web therebetween, a lug fixed in forwardly extending relation to the forward flange of each of said axle hangers adjacent the lower end thereof, and a draft member pivoted to said lugs.

4. In a trailer, a gear including an axle comprising a transverse channel having its web portion uppermost and depending flanges, an axle hanger fixed at its upper end to each end of said transverse channel, each axle hanger comprising a short section of channel having its flanges extending laterally outwardly and its web welded or otherwise secured to the web and flange ends of the transverse channel, a spindle carrying part slidably disposed between and in close fitting contact with the flanges of each of said axle hangers and means for securing said spindle parts to said axle hangers, respectively, with said parts in contact with the flanges of said hangers, whereby said parts are held against rotation about generally vertical axes by said flanges independent of said holding means.

5. In a trailer, a gear including an axle comprising a transverse channel having its web portion uppermost and its flanges extending downwardly, an axle hanger fixed at its upper end to each end of said transverse channel, each axle hanger comprising a short section of channel having its flanges extending laterally outwardly and its web secured to the web- and flange-ends of the associated end of said transverse channel, a spindle carrying member having flanges disposed in close fitting relation between the flanges of each axle hanger, said spindle carrying members being arranged with their flanges extending laterally inwardly and its web disposed laterally outwardly, and a spindle carried by the lower portion of the web of each of said spindle-carrying members.

6. In a trailer, a gear including as axle comprising a transverse member, an axle hanger secured at its upper end to each end of said transverse member in depending relation, a spindle carried at the lower end of each axle hanger, a reach pivoted to the central portion of said transverse member generally on the under side thereof and between said depending axle hangers, and upper and lower hound quadrants disposed in the space between said depending axle hangers and secured to said transverse member on the upper and lower sides of said reach.

7. The invention set forth in claim 3, further characterized by said draft member comprising a central channel, a pair of divergent braces, and a transverse shaft pivoting the rear ends of said braces and draft channel to said lugs.

8. In a trailer or the like, a gear including an axle comprising a transverse member, an axle hanger secured at its upper end to each end of said transverse member in depending relation, each hanger comprising a short section of channel having its flanges extending laterally outwardly and its web secured to the associated end of the transverse member, a pair of spindle-carrying members, each comprising a short section of channel disposed in between the flanges of the associated axle hanger and with its flanges extending laterally inwardly and in close fitting contact with the flanges of the associated axle hanger, and means securing each spindle-carrying member to its associated axle hanger.

9. The invention set forth in claim 3, further characterized by said spindle-carrying members being adjustable generally vertically in said axle hangers, and draft means connected with the axle hangers so as to apply draft to the trailer independent of the position of said spindle-carrying members in said axle hangers.

10. In an axle construction, an axle member having a pair of generally vertical laterally spaced and outwardly extending flanges, and a spindle-carrying member having a pair of vertical laterally inwardly extending spaced flanges adjustable vertically along and in substantial contact with said first mentioned flanges, and means for holding said members with their flanges in contact.

FRED L. STOCKWELL.

REFERENCES CITED

The following references are of record in the file of this patent:

UNITED STATES PATENTS

| Number | Name | Date |
|---|---|---|
| 2,342,618 | Theiman | Feb. 22, 1944 |
| 2,190,300 | Van Zeeland et al. | Feb. 13, 1940 |
| 2,190,091 | Wolfe | Feb. 13, 1940 |
| 2,275,302 | Maunson | Mar. 3, 1942 |
| 390,872 | Mandt | Oct. 9, 1888 |
| 254,104 | Beach | Feb. 28, 1882 |
| 1,363,245 | Gardner | Dec. 28, 1920 |